US012343969B2

(12) United States Patent
Akiyama et al.

(10) Patent No.: US 12,343,969 B2
(45) Date of Patent: Jul. 1, 2025

(54) SHEET PROCESSING APPARATUS, IMAGE FORMING APPARATUS, AND IMAGE FORMING SYSTEM

(71) Applicants: Joji Akiyama, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Shinya Monma, Kanagawa (JP); Yohsuke Haraguchi, Kanagawa (JP); Wataru Nozaki, Kanagawa (JP)

(72) Inventors: Joji Akiyama, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Shinya Monma, Kanagawa (JP); Yohsuke Haraguchi, Kanagawa (JP); Wataru Nozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 350 days.

(21) Appl. No.: 17/719,641

(22) Filed: Apr. 13, 2022

(65) Prior Publication Data

US 2022/0334523 A1 Oct. 20, 2022

(30) Foreign Application Priority Data

Apr. 16, 2021 (JP) .................................. 2021-069441

(51) Int. Cl.
*B32B 37/00* (2006.01)
*B32B 37/14* (2006.01)
*B32B 37/18* (2006.01)

(52) U.S. Cl.
CPC ...... *B32B 37/0053* (2013.01); *B32B 37/0015* (2013.01); *B32B 37/0046* (2013.01);
(Continued)

(58) Field of Classification Search
CPC ............ B32B 37/0053; B32B 37/0015; B32B 37/0046; B32B 37/185; B32B 37/142; B32B 2037/0061
See application file for complete search history.

(56) References Cited

U.S. PATENT DOCUMENTS 5,306,381 A * 4/1994 Nakazawa .............. B32B 38/14
219/508
2001/0054486 A1* 12/2001 Botta ...................... B32B 37/185
156/555
(Continued)

FOREIGN PATENT DOCUMENTS

CN  108773149 A  * 11/2018  ............. B32B 37/10
JP  2005-314102     11/2005
(Continued)

*Primary Examiner* — George R Koch
(74) *Attorney, Agent, or Firm* — Harness, Dickey & Pierce, P.L.C.

(57) ABSTRACT

A sheet processing apparatus sandwiches a sheet media in a two-ply sheet in which two sheets are overlaid and bonded together at a portion of the two-ply sheet. The sheet processing apparatus includes a fixing device, a tray, and a roller. The fixing device applies heat and pressure to the two-ply sheet. The tray is disposed downstream from the fixing device in a conveyance direction of the two-ply sheet, to stack the two-ply sheet. The roller conveys the two-ply sheet vertically downward toward the tray after the two-ply sheet passes through the fixing device.

14 Claims, 5 Drawing Sheets

(52) U.S. Cl.
CPC .... *B32B 37/185* (2013.01); *B32B 2037/0061* (2013.01); *B32B 37/142* (2013.01)

(56) References Cited

U.S. PATENT DOCUMENTS

| | | |
|---|---|---|
| 2015/0091246 A1 | 4/2015 | Yoshida et al. |
| 2016/0340145 A1 | 11/2016 | Kunieda et al. |
| 2017/0021603 A1* | 1/2017 | Kikuchi .............. B32B 37/0053 |
| 2019/0176456 A1* | 6/2019 | Oka .................... B32B 38/0004 |
| 2019/0284012 A1 | 9/2019 | Yoneyama et al. |
| 2020/0247636 A1 | 8/2020 | Furuhashi et al. |
| 2020/0341414 A1 | 10/2020 | Watanabe et al. |
| 2020/0407187 A1 | 12/2020 | Hidaka et al. |
| 2021/0039900 A1 | 2/2021 | Shimazu et al. |
| 2021/0039916 A1 | 2/2021 | Sugiyama et al. |
| 2021/0253385 A1 | 8/2021 | Yoshito et al. |
| 2021/0289090 A1 | 9/2021 | Monma et al. |
| 2021/0294249 A1 | 9/2021 | Takahashi et al. |
| 2021/0325804 A1 | 10/2021 | Furuhashi et al. |
| 2021/0333730 A1 | 10/2021 | Asano et al. |
| 2021/0347160 A1 | 11/2021 | Akiyama et al. |
| 2021/0347589 A1 | 11/2021 | Suzuki et al. |
| 2021/0354948 A1 | 11/2021 | Takahashi et al. |
| 2021/0356899 A1 | 11/2021 | Takahashi et al. |
| 2021/0387467 A1 | 12/2021 | Asano et al. |
| 2021/0403273 A1 | 12/2021 | Haraguchi et al. |
| 2021/0405571 A1 | 12/2021 | Nozaki et al. |
| 2022/0011712 A1 | 1/2022 | Asano et al. |

FOREIGN PATENT DOCUMENTS

| | | |
|---|---|---|
| JP | 2009-040015 | 2/2009 |
| JP | 2015-221536 | 12/2015 |
| JP | 2020-121868 | 8/2020 |

* cited by examiner

SHEET PROCESSING APPARATUS, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-069441, filed on Apr. 16, 2021, in the Japan Patent Office, the entire disclosure of which is hereby incorporated by reference herein.

BACKGROUND

Technical Field

Embodiments of the present disclosure relate to a sheet processing apparatus, an image forming apparatus, and an image forming system.

Related Art

Lamination technologies have been proposed that insert an inner sheet (e.g., paper or photo) between a two-ply sheet or lamination film (e.g., a lamination pouch or lamination folder) and apply heat and pressure to the two-ply sheet to bond the two-ply sheet. The two-ply sheet is made of two sheets (plies) bonded (sealed) on one side as if one sheet is folded.

For example, in a lamination processing machine in the related art, a two-ply sheet is conveyed in a horizontal direction in order to heat and pressure-bond the two-ply sheet in a fixing unit. Accordingly, a space for a sheet ejection tray is not secured, and the two-ply sheet is not stacked on the sheet ejection tray. In another example, a lamination processing machine is capable of stacking sheets by a sheet discharge tray obliquely arranged to save space. However, there is a disadvantage in that a leading end of a pressure-bonded two-ply sheet hangs down in the sheet ejection tray and the two-ply sheet is bent.

Here, the bending of the two-ply sheet is described in detail. In lamination processing, a two-ply sheet is heated in a fixing unit. Accordingly, if the two-ply sheet is deformed in a hot state and cooled in that state, the shape of the two-ply sheet is fixed in a bent state. In a case where a two-ply sheet is ejected to a sheet ejection tray having an upward angle as in the sheet ejection tray of the laminate processing machine described above, a leading end of the ejected two-ply sheet is lifted upward along the sheet ejection tray. The contact of the two-ply sheet with an inclined portion during sheet ejection means that an external force causing deformation is applied to the two-ply sheet in a hot state. Since the heat is gradually taken away during the sheet ejection in this hot state, the bending formed during sheet ejection remains and the bent two-ply sheet is output. That is, unless the two-ply sheet is ejected in a state where the two-ply sheet is kept parallel to a fixing nip, the two-ply sheet to be output is bent. In the case of a horizontal-conveyance-type laminating apparatus, a two-ply sheet on the same line as a fixing nip need to be held until the two-ply sheet passes through the fixing nip. Accordingly, not only in the case of a sheet ejection tray directed obliquely upward but also in the case of a falling-type sheet ejection tray directed obliquely downward, the leading end of the two-ply sheet hangs down by gravity, so that the two-ply sheet may be bent.

SUMMARY

According to an embodiment of the present disclosure, a sheet processing apparatus sandwiches a sheet media in a two-ply sheet in which two sheets are overlaid and bonded together at a portion of the two-ply sheet. The sheet processing apparatus includes a fixing device, a tray, and a roller. The fixing device applies heat and pressure to the two-ply sheet. The tray is disposed downstream from the fixing device in a conveyance direction of the two-ply sheet, to stack the two-ply sheet. The roller conveys the two-ply sheet vertically downward toward the tray after the two-ply sheet passes through the fixing device.

According to another embodiment of the present disclosure, an image forming apparatus includes an image forming device configured to form an image and the sheet processing apparatus described above.

According to still another embodiment of the present disclosure, an image forming system includes the sheet processing apparatus described above.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
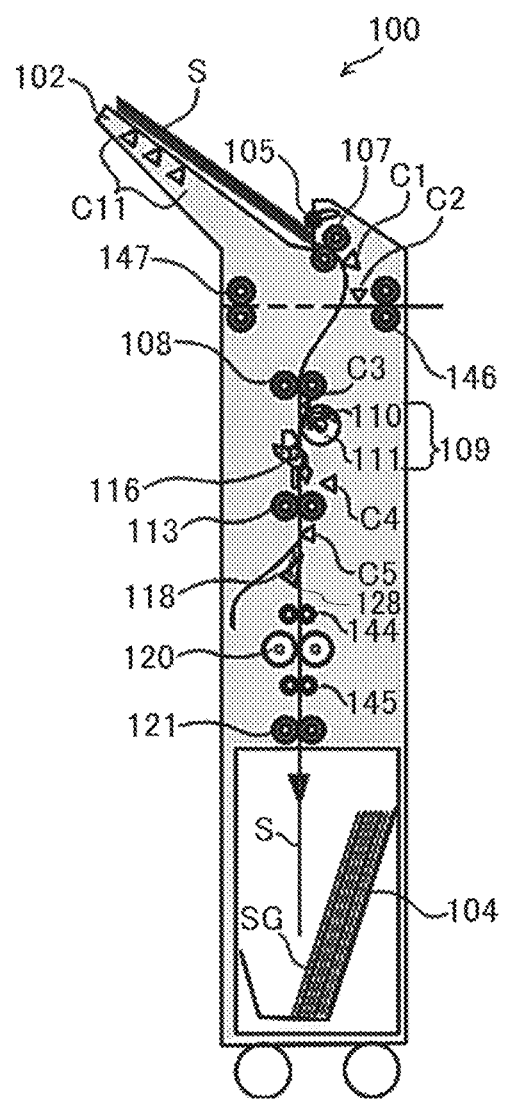
FIG. 1 is a schematic diagram illustrating an overall configuration of a sheet processing apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic diagram illustrating a general arrangement of a sheet processing apparatus according to an embodiment of the present disclosure. A sheet processing apparatus 100 according to the present embodiment separates two sheets (plies) of a two-ply sheet (hereinafter referred to as a lamination sheet S) to insert and sandwich a sheet-shaped medium (hereinafter referred to as an inner sheet P) between the separated sheets of the lamination sheet S.

The lamination sheet S is the two-ply sheet in which two sheets are overlapped and bonded together at a portion (or a side) of the two-ply sheet. For example, there is a two-ply sheet in which a first side as a transparent sheet such as a transparent polyester sheet and a second side facing the first side as a transparent or opaque sheet are bonded at one side of the two-ply sheet. Examples of the two-ply sheet also include a lamination film.

The inner sheet P is an example of the sheet-shaped medium that is inserted into the two-ply sheet. The sheet-shaped medium may be, for example, thick paper, a post-card, an envelope, plain paper, thin paper, coated paper, art paper, tracing paper, and an overhead projector (OHP) transparency.

As illustrated in FIG. 1, the sheet processing apparatus 100 includes a sheet feeding tray 102 serving as a first stacker that stacks lamination sheets S, a pickup roller 105 that feeds the lamination sheets S from the sheet feeding tray 102, and first conveyance rollers 107. In the sheet feeding tray 102 of the sheet processing apparatus 100, a plurality of sensors C11 is disposed to detect the size of the lamination sheet S.

A lamination sheet S into which an inner sheet has been inserted is ejected and stacked on a sheet ejection tray 104 by third conveyance rollers 113 or a roller disposed downstream from the third conveyance rollers 113. The sheet ejection tray 104 is disposed inside a housing of the sheet processing apparatus 100. Such a configuration facilitates a vertical conveyance of the lamination sheet S toward the sheet ejection tray 104.

A conveyance sensor C1 is disposed downstream from the first conveyance rollers 107 in the sheet conveyance direction to detect the sheet conveyance position of the lamination sheet S. A conveyance sensor C2 is disposed downstream from entrance rollers 146 in the sheet conveyance direction to detect the sheet conveyance position of the inner sheet P.

The sheet processing apparatus 100 further includes, for example, second conveyance rollers 108, a winding roller 109 as a rotating member, third conveyance rollers 113, fourth conveyance rollers 144, fifth conveyance rollers 145, ejection rollers 121, and the sheet ejection tray 104 downstream from the first conveyance rollers 107 in the conveying direction. Separation claws 116 are disposed between the winding roller 109 and the third conveyance rollers 113 to be movable in the width direction of the lamination sheet S. The separation claws 116 serve as a separator that separates the lamination sheet S according to the present embodiment.

A conveyance sensor C3 that detects the positions of a lamination sheet S and an inner sheet P being conveyed is disposed downstream from the second conveyance rollers 108 in the sheet conveyance direction. An abnormality detection sensor C4 that detects the state of the lamination sheet S is disposed downstream from the winding roller 109 in the sheet conveyance direction. A conveyance sensor C5 that detects the position of the lamination sheet S being conveyed is disposed downstream from the third conveyance rollers 113 in the sheet conveyance direction.

The pickup roller 105, the first conveyance rollers 107, the second conveyance rollers 108, and the winding roller 109 are some examples of a first feeder.

In FIG. 1, each set of the second conveyance rollers 108 and the third conveyance rollers 113 is, for example, a pair of two rollers, and is rotationally driven by a driving device (e.g., a motor). Each one of the second conveyance rollers 108 rotates in one direction. Each one of the third conveyance rollers 113 rotates in forward and reverse directions, thereby nipping and conveying the lamination sheet S and the inner sheet P.

The second conveyance rollers 108 convey the lamination sheet S and the inner sheet P vertically downward toward the third conveyance rollers 113.

On the other hand, the rotation of the third conveyance rollers 113 can be switched between a forward direction and a reverse direction. The third conveyance rollers 113 can nip and convey the lamination sheet S vertically downward toward the sheet ejection tray 104 and also convey the lamination sheet S vertically upward toward the winding roller 109 in the reverse direction, that is, a direction to pull back the lamination sheet S.

The sheet processing apparatus 100 further includes the winding roller 109, which is a rotating member, and the separation claws 116 between the second conveyance rollers 108 and the third conveyance rollers 113. The winding roller 109 is driven by the driving device such as a motor to rotate in the forward direction and the reverse direction. The direction of rotation of the winding roller 109 is switchable between the forward direction (i.e., clockwise direction) and the reverse direction (i.e., counterclockwise direction).

The winding roller 109 includes a roller 111 and a gripper 110 movably disposed on the roller 111 to grip the lamination sheet S. The gripper 110 that is movable grips a trailing end of the lamination sheet S in the forward conveyance direction together with the roller 111. The gripper 110 may be integrated with the outer circumference of the roller 111 or may be a separate component.

Next, a description is given of a series of operations performed in the sheet processing apparatus 100, with reference to FIG. 1. The series of operations performed by the sheet processing apparatus 100 indicates the operations from separating the lamination sheet S to inserting the inner sheet P into the lamination sheet S.

In FIG. 1, the lamination sheets S are stacked on the sheet feeding tray 102 such that a bonded end of the lamination sheet S is located downstream from the pickup roller 105 in the sheet feed direction (sheet conveyance direction). The sheet processing apparatus 100 picks the lamination sheet S on the sheet feeding tray 102 by the pickup roller 105 and conveys the lamination sheet S toward the first conveyance rollers 107.

Next, the lamination sheet S is conveyed toward the winding roller 109 by the second conveyance rollers 108 disposed downstream from the first conveyance rollers 107 in the sheet conveyance direction. In the sheet processing apparatus 100, the second conveyance rollers 108 convey the lamination sheet S with the bonded end, which is one of four sides of the lamination sheet S, as a downstream end in the vertical direction (i.e., a vertically downward direction).

Subsequently, when the trailing end of the lamination sheet S in the vertical direction (i.e., the vertically downward direction) passes by the winding roller 109, the sheet processing apparatus 100 temporarily stops the conveyance.

Next, the sheet processing apparatus 100 opens the gripper 110, reverses the rotation direction of each one of the third conveyance rollers 113, and conveys the lamination sheet S vertically upward toward an opened portion of the gripper 110.

Subsequently, the sheet processing apparatus 100 stops rotation of the third conveyance rollers 113 to stop conveyance of the lamination sheet S when the trailing end of the lamination sheet S is inserted into the opened portion of the gripper 110, and closes the gripper 110 to grip the trailing end of the lamination sheet S. Note that these operations are performed when the lamination sheet S is conveyed by a designated amount.

Then, the sheet processing apparatus 100 rotates the winding roller 109 in a direction to wind the lamination sheet S around the winding roller 109. The lamination sheet S is wound around the winding roller 109 from a side (i.e., the trailing end) where two sheets of the lamination sheet S are not bonded.

When the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is formed between the two sheets constructing the two-ply sheet. As the separation claws 116 are inserted into the space formed as described above, from opposed sides of the lamination sheet S, the space between the two sheets is reliably maintained. Note that in response to detection of the leading end of the lamination sheet S with the conveyance sensor C5, the lamination sheet S is conveyed from the conveyance sensor C5 by a designated amount to perform these operations.

The sheet processing apparatus 100 rotates the winding roller 109 counterclockwise in a state where the separation claws 116 are inserted into the space generated in the lamination sheet S, and moves the space where the lamination sheet S is peeled to the trailing end of the lamination sheet S in the vertical direction (i.e., the vertically downward direction). After the space has been moved by the gripper 110 is opened. Accordingly, the lamination sheet S is separated into the upper and lower sheets at the trailing end.

In this state, the sheet processing apparatus 100 temporarily stops the conveyance of the lamination sheet S and further moves the separation claws 116 in the width direction of the lamination sheet S to separate the whole area of the trailing end of the lamination sheet S. Note that in response to detection of the leading end of the lamination sheet S with the conveyance sensor C5, the lamination sheet S is conveyed from the conveyance sensor C5 by a designated amount to perform these operations.

Next, the sheet processing apparatus 100 rotates the third conveyance rollers 113 counterclockwise to convey the lamination sheet S in the reverse conveyance direction. A branching claw 118 can be switched at the time when the leading end of the lamination sheet S passes through the conveyance sensor C5. When the lamination sheet S is conveyed to a non-fixing path, the branching claw 118 remains at the position illustrated in FIG. 8. However, when the lamination sheet S is conveyed to a fixing path 128 toward the thermal pressure rollers 120, the branching claw 118 is switched in the direction toward the fixing path 128.

The separation claws 116 guide the two sheets separated from the lamination sheet S in the right and left directions in FIG. 1 and thus the two sheets are fully separated. The sheet processing apparatus 100 temporarily stops the conveyance of the lamination sheet S, and the bonded portion of the lamination sheet S is held (nipped) by the third conveyance rollers 113. Accordingly, one end of the lamination sheet S is bonded as the bonded side of the lamination sheet S and the other end of the lamination sheet S is open widely.

Note that in response to detection of the leading end of the lamination sheet S with the conveyance sensor C5, the lamination sheet S is conveyed from the conveyance sensor C5 by a designated amount to perform these operations.

Next, the sheet processing apparatus 100 rotates the second conveyance rollers 108 to convey the inner sheet P conveyed from the image forming apparatus side vertically downward toward the third conveyance rollers 113. The image forming apparatus will be described below with reference to FIG. 6.

Subsequently, the sheet processing apparatus 100 rotates the third conveyance rollers 113 to merge the lamination sheet S and the inner sheet P, and inserts the inner sheet P into the opened lamination sheet S.

Figure 7:
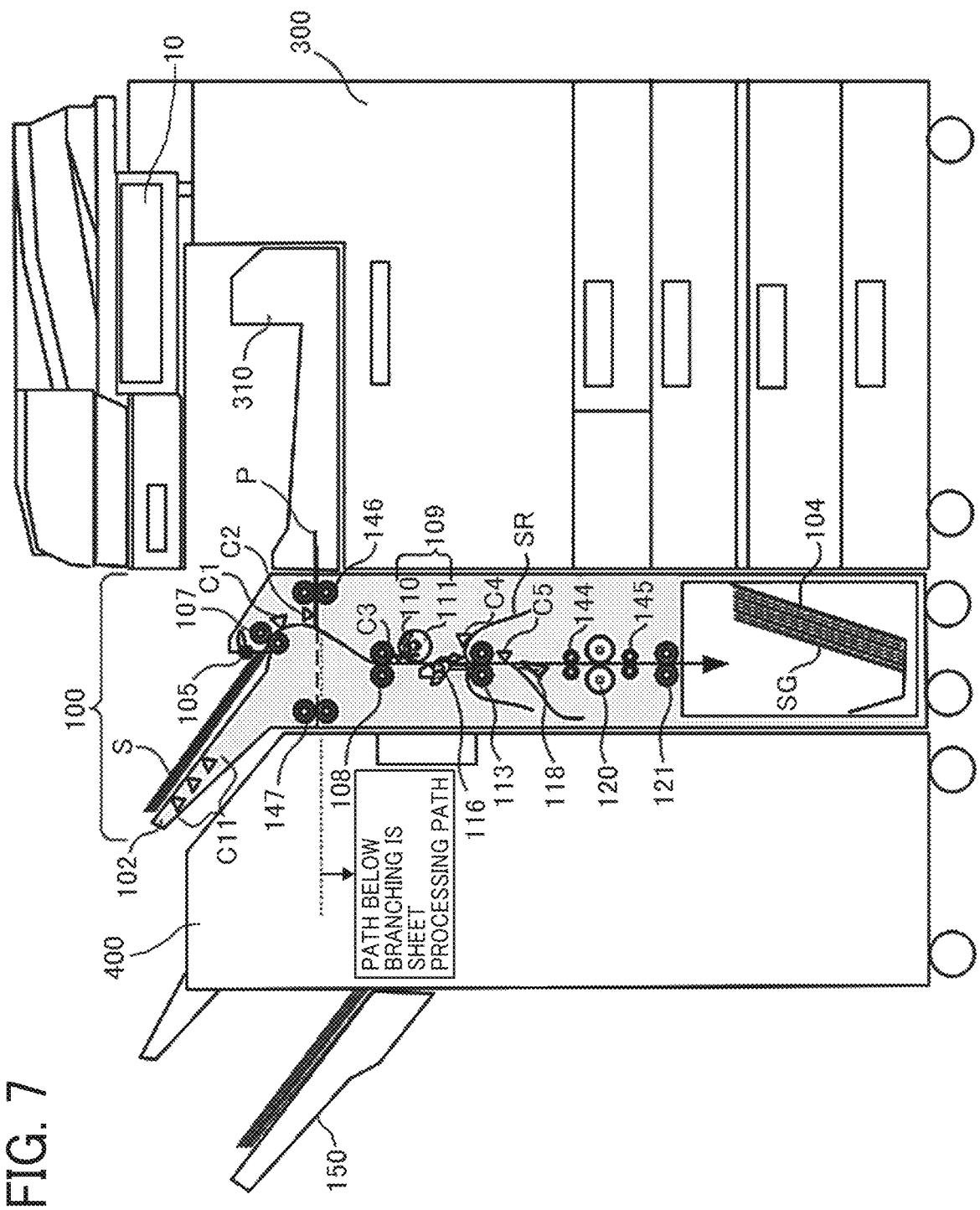
FIG. 7 is a schematic diagram illustrating an overall configuration of an image forming apparatus including a sheet processing apparatus according to an embodiment of the present disclosure.

The operation from separation (peeling) of the lamination sheet S to insertion of the inner sheet P has been described above. The state of the opened lamination sheet S is illustrated in FIG. 7.

Next, the sheet processing apparatus 100 causes the third conveyance rollers 113 to convey the lamination sheet S, in which the inner sheet P has been inserted, downward in the vertical direction. Thus, two sheets of the lamination sheet S overlap again and the opening of the lamination sheets S is closed. The lamination sheet S in which the inner sheet P has been sandwiched is conveyed to a fixing device having thermal pressure rollers 120 by the third conveyance rollers 113 or, for example, a roller disposed downstream from the third conveyance rollers 113 in the conveyance direction of the lamination sheet S.

When passing through the thermal pressure rollers 120, the lamination sheet S is thermally pressed and fixed. After passing through the thermal pressure rollers 120, the lamination sheet S continues to be conveyed vertically downward toward the sheet ejection tray 104 and is stacked on the sheet ejection tray 104. Since the lamination sheet S pressed after passing through the thermal pressure rollers 120 is ejected vertically downward in this manner, the lamination sheet S can be stacked on the sheet ejection tray 104 while preventing the heated lamination sheet S from being bent by an external force.

More specifically, in the vertical conveyance according to the present embodiment, the lamination sheet S is ejected vertically downward. Accordingly, the gravity applied to the lamination sheet S is parallel to the tangent line of a fixing nip between the thermal pressure rollers 120, and an external force that may deform the lamination sheet S is not applied to the lamination sheet S. Thus, as long as the lamination sheet S continues to be ejected vertically, deformation of the lamination sheet S is reduced. The sheet ejection tray 104 is disposed after the trailing end of the lamination sheet S passes through the thermal pressure rollers 120 and the ejection rollers 121, and the lamination sheet S is cooled before reaching the sheet ejection tray 104. Accordingly, the inclination of the stacking surface of the sheet ejection tray 104 does not apply an external force that may deform the lamination sheet S to the lamination sheet S.

As the lamination sheet S is conveyed vertically downward, the lamination sheet S continues to be conveyed vertically downward until the leading end of the lamination sheet S reaches the thermal pressure rollers 120 and the trailing end of the lamination sheet S completely passes through the thermal pressure rollers 120. Such a configuration can ensure the vertical conveyance of the lamination sheet S and prevent the lamination sheet S after thermal pressing from being bent by an external force.

The sheet processing apparatus 100 performs a series of operations of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations can be performed automatically without human intervention, and convenience can be improved compared to the related art. Since the sheet processing apparatus 100 includes the fixing device including the thermal pressure rollers 120 and can perform lamination processing, the sheet processing apparatus 100 may be referred to as a lamination processing apparatus in a narrow sense.

Figure 2:
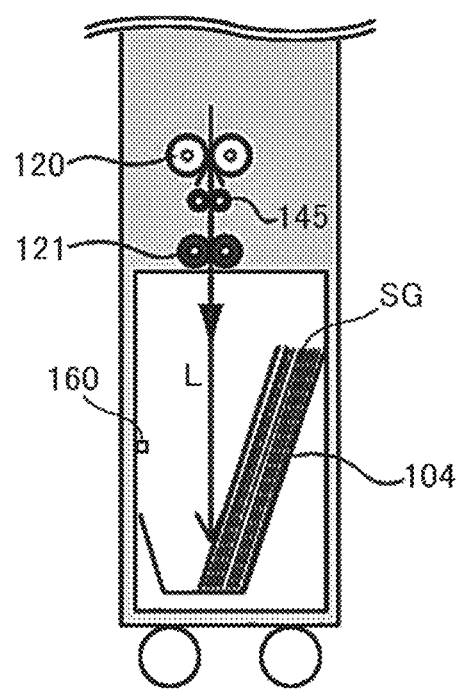
FIG. 2 is an enlarged view of a part from a thermal pressure rollers to a sheet ejection tray, according to an embodiment of the present disclosure.

FIG. 2 is an enlarged view of a part from the thermal pressure rollers 120 to the sheet ejection tray 104, according to an embodiment of the present disclosure.

In this example, a plurality of sheets (laminated sheets SG) are stacked on the sheet ejection tray 104. As illustrated in FIG. 2, a distance L from the fixing nip of the thermal pressure rollers 120 to the stacking surface of the sheet ejection tray 104 or the uppermost surface of the laminated sheets SG stacked on the sheet ejection tray 104 on an extension line of a conveyance path is longer than the length of the lamination sheet S in the conveyance direction. Accordingly, the leading end of the lamination sheet S does not contact the stacking surface of the sheet ejection tray 104 or the stacked laminated sheets SG until the trailing edge of the lamination sheet S completely passes through the thermal pressure rollers 120, thus preventing the heated sheet S from being bent by an external force.

The sheet ejection tray 104 can stack lamination sheets S up to a thickness of, for example, 50 mm. In order to detect the full state of the laminated sheets SG, an optical sensor 160 (e.g., a laser displacement meter) that detects the uppermost surface of the stacked laminated sheets SG is provided with the sheet ejection tray 104. In this case, the length L is longer than the length of the lamination sheet S in the conveyance direction at least up to the thickness of 50 mm of laminated sheets SG.

Figure 3:
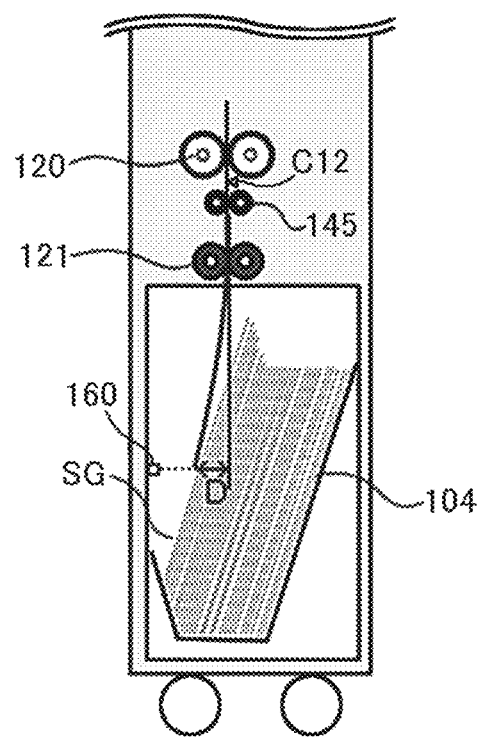
FIG. 3 is an enlarged view of a part from a thermal pressure rollers to a sheet ejection tray, according to another embodiment of the present disclosure.

FIG. 3 is an enlarged view of a part from the thermal pressure rollers 120 to the sheet ejection tray 104, according to another embodiment of the present disclosure.

In this example, more sheets (laminated sheets SG) than in the example illustrated in FIG. 2 are stacked on the sheet ejection tray 104. As illustrated in FIG. 3, when the leading edge of the lamination sheet S being ejected from the ejection rollers 121 contacts the uppermost surface of the laminated sheets SG after fixing in the sheet ejection tray 104, the lamination sheet S is bent.

Here, the sheet processing apparatus 100 is configured such that a length D between a contact point of the leading edge of the lamination sheet S during sheet ejection and the uppermost surface of the laminated sheets SG and a vertical line passing through the nip of the ejection rollers 121 is equal to or less than 30 mm. For example, an optical sensor 160 (for example, a laser-displacement meter) is disposed at a position from the sheet ejection tray 104 such that the optical sensor 160 detects the distance to the uppermost sheet of the stacked laminated sheets SG that is at a position where the distance D is 30 mm. Such a configuration can determine whether the distance D is equal to or less than 30 mm.

In the configuration in which the distance D is set to be equal to or less than 30 mm, the bending of the lamination sheet S can be reduced to be small and the stacking performance can be enhanced, even if the leading end of the lamination sheet S during sheet ejection contacts the uppermost surface of the laminated sheets SG. When the optical sensor 160 detects that the length D exceeds 30 mm, the sheet processing apparatus 100 determines that the sheet ejection tray 104 is full, and stops fixing and conveying the lamination sheet S. Preventing the distance D from exceeding 30 mm in this manner can prevent the lamination sheet S from being largely bent when the leading end of the lamination sheet S during sheet ejection contacts the uppermost surface of the laminated sheets SG. Note that the numerical value "30 mm" is merely an example, and is a numerical value determined by evaluating in advance the thickness of the lamination sheet S and the inner sheet P to be used depending on the specifications of the sheet processing apparatus.

As illustrated in FIGS. 1 to 3, the ejection rollers 121 that eject the lamination sheet S toward the sheet ejection tray 104 are disposed downstream from the thermal pressure rollers 120. Ejecting the lamination sheet S by the ejection rollers 121 can reduce the formation of wrinkles on the lamination sheet S after thermal pressing. Ejecting the lamination sheet S in the vertical direction by the ejection rollers 121 can reduce bending of the lamination sheet S after the thermal pressing.

Figure 4:
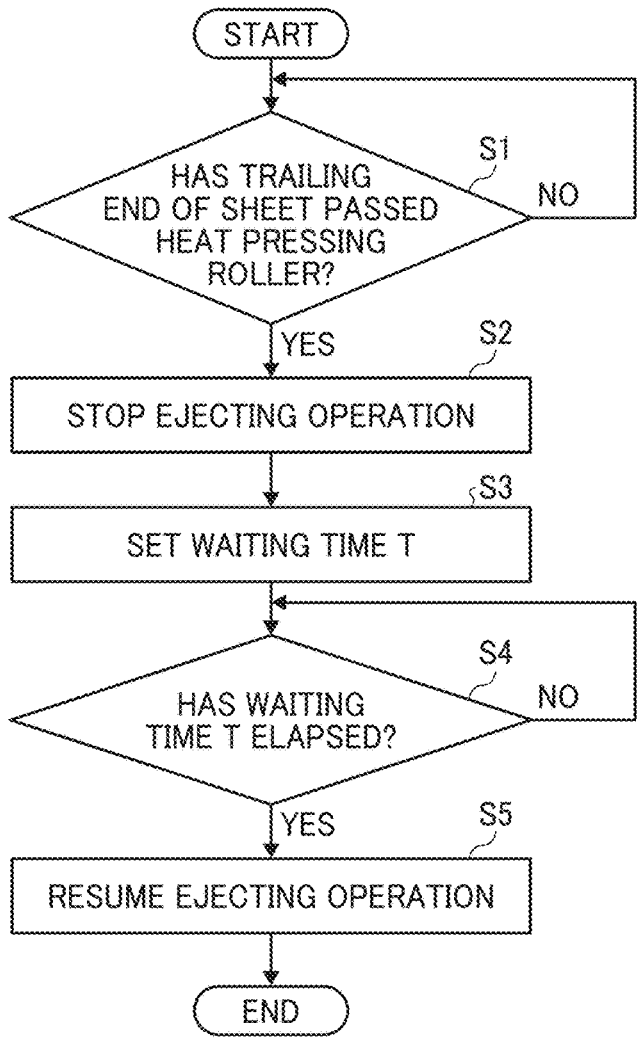
FIG. 4 is a flowchart illustrating a sheet ejecting operation of a sheet processing apparatus, according to an embodiment of the present disclosure.

FIG. 4 is a flowchart illustrating a sheet ejecting operation of the sheet processing apparatus, according to an embodiment of the present disclosure.

After the start of a thermal pressing operation in the fixing device including the thermal pressure rollers 120, the sheet processing apparatus 100 determines in step S1 whether the trailing edge of the lamination sheet S has completely passed through the thermal pressure rollers 120. For this determination, the sheet processing apparatus 100 includes a detector that detects the lamination sheet S, and the detector is, for example, a sensor C12 (see FIG. 3) disposed downstream from the thermal pressure rollers 120 in the conveyance direction of the lamination sheet S.

When the trailing end of the lamination sheet S completely passes through the thermal pressure rollers 120 (Yes in S1), the sheet processing apparatus 100 stops the sheet ejecting operation of the lamination sheet S in step S2 and holds the lamination sheet S by the ejection rollers 121. Next, in step S3, a timer in the sheet processing apparatus 100 sets a waiting time T in accordance with the size of the lamination sheet S detected by the sensor C11, and it is determined in step S4 whether the waiting time T has elapsed. When the waiting time T has elapsed (Yes in S4), the sheet processing apparatus 100 resumes the sheet ejecting operation of the lamination sheet S in step S5 and ejects the lamination sheet S.

As described above, the sheet processing apparatus 100 stops the ejection rollers 121, holds the lamination sheet S by the ejection rollers 121, and resumes the sheet ejecting operation after waiting for the waiting time T (required time) to elapse. Accordingly, the lamination sheet S is ejected after waiting for a decrease of the temperature of the thermally-pressed lamination sheet S, thus reducing the bending of the lamination sheet S.

Figure 5:
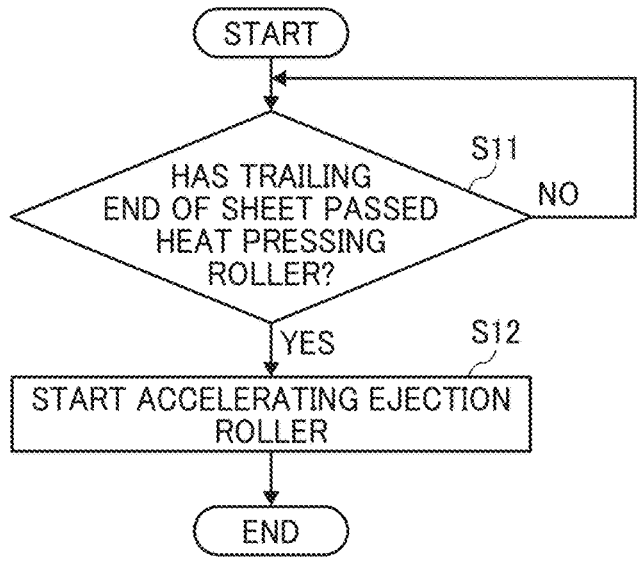
FIG. 5 is a flowchart illustrating a sheet ejecting operation of a sheet processing apparatus, according to another embodiment of the present disclosure.

FIG. 5 is a flowchart illustrating a sheet ejecting operation of the sheet processing apparatus, according to another embodiment of the present disclosure.

After the start of a thermal pressing operation in the fixing device including the thermal pressure rollers 120, the sheet processing apparatus 100 determines in step S11 whether the trailing edge of the lamination sheet S has completely passed through the thermal pressure rollers 120. For this determination, the sheet processing apparatus 100 includes a detector that detects the lamination sheet S, and the detector is, for example, a sensor C12 (see FIG. 3) disposed downstream from the thermal pressure rollers 120 in the conveyance direction of the lamination sheet S.

When the trailing end of the lamination sheet S has completely passed through the thermal pressure rollers 120 (Yes in S11), the sheet processing apparatus 100 increases the rotation speed of the ejection rollers 121 in step S12 to increase the conveyance speed of the lamination sheet S. Accordingly, the time during which the leading end of the thermally-pressed lamination sheet S contacts the stacking surface of the sheet ejection tray 104 or the uppermost surface of the stacked sheets SG is shortened, and thus the bending of the lamination sheet S can be reduced.

Figure 6:
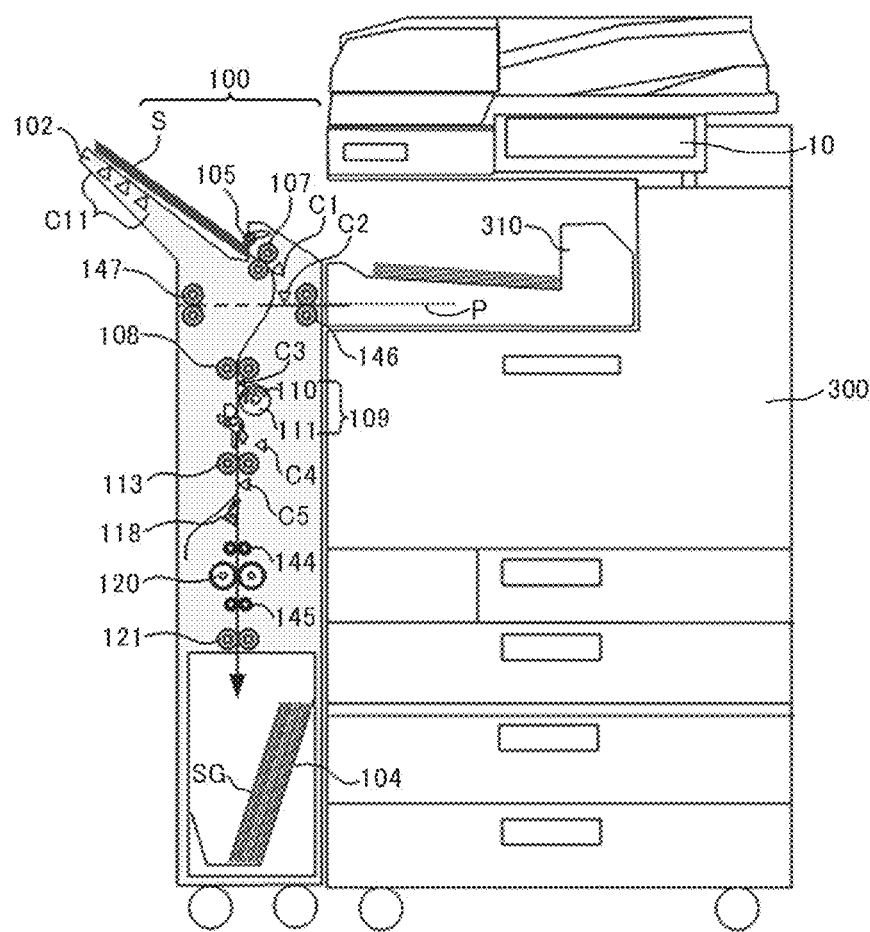
FIG. 6 is a schematic view illustrating an overall configuration of an image forming apparatus including a sheet processing apparatus according to an embodiment of the present disclosure.

FIG. 6 is a schematic diagram illustrating the overall configuration of an image forming apparatus including a sheet processing apparatus according to an embodiment of the present disclosure. The image forming apparatus 300 includes an image forming device that forms an image on, for example, an inner sheet P, and a sheet processing apparatus 100 as an external sheet processing apparatus. The sheet processing apparatus 100 includes a sheet feeding tray 102 on which sheets S are stacked, and is configured to receive inner sheets P fed from the image forming apparatus 300 via a relay apparatus 310. Accordingly, the image forming apparatus 300 (e.g., a printer or a copier) can insert an image on the inner sheet P into the lamination sheet S in an in-line system. Thus, the image forming apparatus 300 can perform a series of operations of, in this order, the feeding of the lamination sheet S, the separation of the lamination sheet S, the insertion of the lamination sheet S, and the lamination processing under heat and pressure without using manpower.

An operation panel 10 serving as a display operation device that displays information in the image forming apparatus 300 and receives an operation input is installed in an exterior portion of the image forming apparatus 300. The operation panel 10 also serves as a notification device to output a perceptual signal to a user. Alternatively, a notification device other than the operation panel 10 may be separately disposed in the image forming apparatus 300.

FIG. 7 is a schematic diagram illustrating the overall configuration of an image forming apparatus including a sheet processing apparatus according to an embodiment of the present disclosure. The image forming system includes an image forming apparatus 300, a relay apparatus 310, a sheet processing apparatus 100, and a post-processing apparatus 400.

The image forming system according to the present embodiment can feed an inner sheet P from the image forming apparatus 300 via the relay apparatus 310. The post-processing apparatus 400 serving as a post-processing apparatus other than the sheet processing apparatus 100 is disposed downstream from the image forming apparatus 300. Thus, the user can use the image forming system without reducing the efficiency of print jobs in which the lamination processing is not performed.

In the case of a print job in which lamination processing is not performed, the inner sheet P fed from the image forming apparatus 300 is received by entrance rollers 146 of the sheet processing apparatus 100 and conveyed to the post-processing apparatus 400 by ejection rollers 147. The post-processing apparatus 400 is located downstream from the sheet processing apparatus 100 in the sheet conveyance direction, and the ejection rollers 147 is located downstream from the entrance rollers 146 in the sheet conveyance direction. The post-processing apparatus 400 can perform post-processing such as staple processing on a lamination sheet S that has not been subjected to laminate processing. The inner sheets P are stacked on a sheet ejection tray 150 of the post-processing apparatus 400.

In the case of a print job in which laminate processing is performed, the sheet processing apparatus 100 feeds a lamination sheet S from a sheet feeding tray 102 on which lamination sheets S are stacked, by a pickup roller 105 and first conveyance rollers 107. A lamination sheet SR in a separate state is held by the third conveyance rollers 113, the inner sheet P fed from the image forming apparatus 300 is received by the entrance rollers 146 of the sheet processing apparatus 100 and merged with the lamination sheet S by the second conveyance rollers 108. The lamination sheet S is laminated by pressing and heating by the thermal pressure rollers 120. The laminated sheet SG is stacked on the sheet ejection tray 104 from the ejection rollers 121.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing apparatus configured to sandwich a sheet media in a two-ply sheet in which two sheets are overlaid and bonded together at a portion of the two-ply sheet, the sheet processing apparatus comprising:
   thermal pressure rollers configured to apply heat and pressure to the two-ply sheet;
   a tray disposed downstream from the thermal pressure rollers in a conveyance direction of the two-ply sheet, to stack the two-ply sheet; and
   ejection rollers configured to convey the two-ply sheet vertically downward toward the tray after the two-ply sheet passes through the thermal pressure rollers,
   wherein the ejection rollers are configured to stop a conveyance of the two-ply sheet after a trailing end of the two-ply sheet passes through the thermal pressure rollers, and restart the conveyance of the two-ply sheet after a predetermined time has elapsed, and
   while the ejection rollers stop in a state in which the trailing end of the two-ply sheet is held between the ejection rollers, a downstream portion of the two-ply sheet, which is downstream from the ejection rollers in the conveyance direction, hangs down in a vertical direction in a state in which the downstream portion is not held between the ejection rollers.

2. The sheet processing apparatus according to claim 1, further comprising a plurality of rollers disposed upstream from the thermal pressure rollers in the conveyance direction and configured to convey the two-ply sheet vertically downward until a leading end of the two-ply sheet in the conveyance direction reaches the thermal pressure rollers and the trailing end of the two-ply sheet in the conveyance direction passes through the thermal pressure rollers.

3. The sheet processing apparatus according to claim 1, wherein a distance from the thermal pressure rollers to a stacking surface of the tray on an extension line of a conveyance path or an uppermost surface of the two-ply sheet stacked on the tray is longer than a length of the two-ply sheet.

4. The sheet processing apparatus according to claim 1, wherein the ejection rollers are disposed downstream from the thermal pressure rollers in the conveyance direction.

5. The sheet processing apparatus according to claim 4, wherein a distance between a vertical line passing through a nip between the ejection rollers and a contact point between a leading end of the two-ply sheet being ejected and a stacking surface of the two-ply sheet is less than or equal to 30 millimeters until the trailing end of the two-ply sheet passes through the thermal pressure rollers.

6. The sheet processing apparatus according to claim 4, wherein the ejection rollers are configured to increase a rotation speed after the trailing end of the two-ply sheet passes through the thermal pressure rollers.

7. An image forming apparatus comprising:
   an image forming device configured to form an image on a sheet medium; and
   the sheet processing apparatus according to claim 1.

8. An image forming system comprising:
   an image forming apparatus configured to form an image on a sheet medium; and
   the sheet processing apparatus according to claim 1.

9. The sheet processing apparatus according to claim 1, wherein the predetermined time changes depending on a size of the two-ply sheet.

10. The sheet processing apparatus according to claim 1, further comprising a timer configured to set the predetermined time during which the conveyance of the two-ply sheet is stopped based on a size of the two-ply sheet.

11. The sheet processing apparatus according to claim 1, further comprising a timer configured to set the predetermined time during which the conveyance of the two-ply sheet is stopped.

12. A sheet processing apparatus configured to sandwich a sheet media in a two-ply sheet in which two sheets are overlaid, the sheet processing apparatus comprising:
   thermal pressure rollers configured to apply heat and pressure to the two-ply sheet;
   a tray disposed downstream from the thermal pressure rollers in a conveyance direction of the two-ply sheet, to stack the two-ply sheet; and
   ejection rollers configured to convey the two-ply sheet vertically downward toward the tray after the two-ply sheet passes through the thermal pressure rollers,
   wherein the ejection rollers are configured to stop a conveyance of the two-ply sheet after a trailing end of the two-ply sheet passes through the thermal pressure rollers, and restart the conveyance of the two-ply sheet after a predetermined time has elapsed, and
   while the ejection rollers stop in a state in which the trailing end of the two-ply sheet is held between the ejection rollers, a downstream portion of the two-ply sheet, which is downstream from the ejection rollers in the conveyance direction, hangs down in a vertical direction in a state in which the downstream portion is not held between the ejection rollers.

13. An image forming apparatus comprising:
   an image forming device configured to form an image on a sheet medium; and
   the sheet processing apparatus according to claim 12.

14. An image forming system comprising:
   an image forming apparatus configured to form an image on a sheet medium; and
   the sheet processing apparatus according to claim 12.

* * * * *